UNITED STATES PATENT OFFICE 2,174,926

PROCESS OF REMOVING MAGNESIUM FROM ALUMINUM ALLOYS CONTAINING MAGNESIUM

Georg Messner, Bitterfeld, Germany, assignor to I. G. Farbenindustrie Aktiengesellschaft, Frankfort-on-the-Main, Germany No Drawing. Application March 27, 1937, Serial No. 133,427. In Germany April 30, 1936

2 Claims. (Cl. 75—68)

This invention relates to a process of removing magnesium for aluminium alloys containing magnesium.

When working-up aluminium scrap of diverse origin the need has long existed of removing the magnesium from magnesiferous scrap aluminium alloys, since if relatively large quantities of magnesium were present in the metal this would necessitate special precautions whenever the metal is subjected to a re-melting and refining operation.

With a view to eliminating the magnesium from the scrap to be worked up, in the form of a saline compound, the present invention provides a process of removing magnesium from aluminium alloys containing magnesium in which the alloys are treated with substances adapted to form, by reaction with molten metallic magnesium, magnesium chloride, at temperatures above the melting point of such saline magnesium compound. If chlorine gas is introduced into the melt, the treatment must consequently be carried out at a temperature above the melting point of anhydrous magnesium chloride, viz., 718° C. Since, however, the speed of reaction between the chlorine and the magnesium increases considerably when higher temperatures are employed, it is advisable to employ temperatures of about 950° to 1000° C.

The method of the present invention is based on the observation that in the treatment with chlorine only the magnesium, and not the aluminium, reacts with the chlorine, and then only when the treatment is carried out at temperatures above the melting point of the magnesium chloride produced. At temperatures below this limit, however, practically no reaction takes place and the chlorine escapes unconsumed to a large extent. The explanation of this phenomenon may possibly be that the small quantities of solid magnesium chloride in the latter case forming initially at the phase boundary between gaseous chlorine and magnesium assume the form of a skin which prevents the further access of chlorine to the metal.

Example 1090 parts by weight of an aluminium-magnesium alloy containing 12% of magnesium were melted in an open crucible and the temperature of the melt was raised to and maintained at 950° C., whereupon gaseous chlorine gas was introduced into the melt through a distributor disposed in and near the bottom of the crucible. After 45 minutes, 430 parts by weight of chlorine had been absorbed by the melt, and the emission of dense vapours from the contents of the crucible and also a noticeable smell of chlorine gas indicated the end of the chlorination. The supply of chlorine was then cut off, and the metal was cooled down to a suitable casting temperature and poured, whilst the slag floating on the surface of the metal was held back by suitable means. Analysis of the metal showed that the magnesium had been quantitatively removed from the alloy.

No appreciable loss of aluminium due to the formation of aluminium chloride could be observed.

I claim:

1. A process of removing magnesium from aluminium alloys containing magnesium which comprises treating such alloys with clorine at temperatures above the melting point of magnesium chloride, but not substantially exceeding about 1000° C., and separating the magnesium chloride formed from the metal.

2. A process of removing magnesium from aluminium alloys containing magnesium which comprises treating such alloys with chlorine at temperatures between about 950° and 1,000° C. and separating the magnesium chloride formed from the metal.

GEORG MESSNER.